UNITED STATES PATENT OFFICE.

JACOB J. E. McLELLAND, OF GROESBECK, TEXAS.

METHOD OF DESTROYING STUMPS OF TREES.

SPECIFICATION forming part of Letters Patent No. 696,836, dated April 1, 1902.

Application filed November 12, 1901. Serial No. 82,038. (No specimens.)

*To all whom it may concern:*

Be it known that I, JACOB J. E. MCLELLAND, a citizen of the United States, residing at Groesbeck, in the county of Limestone and State of Texas, have invented new and useful Improvements in Methods of Destroying Stumps of Trees, of which the following is a specification.

This invention relates to a method of destroying stumps of trees, more particularly the stumps of persimmon and sassafras trees.

The improved compound consists of one part, by weight, of saltpeter, one part, by weight, of soda, and one hundred parts, by weight, of salt.

The above-mentioned ingredients are pulverized and thoroughly mixed together and used in the following manner: The stump is cut off a few inches below the earth's surface, the compound placed upon the top of the stump, and earth is then packed around and upon the stump, so that the compound cannot be washed off by rain. Most satisfactory results are obtained by applying the compound to the stump when there is some indication that the sap is in the heart thereof. It has been noted that August is the proper time to apply the compound to the stump, so that when the sap goes down into the root of the tree in the fall the compound goes down therewith and will exert a destructive effect upon the root of the stump and kill the same.

Having thus fully described my invention, what I claim as new, and desire to secure by Letters Patent, is—

The herein-described method of destroying the stumps of trees consisting of applying a compound of saltpeter, soda and salt to the stump below the earth's surface, and then packing a protective coating around and upon the said stump to prevent removal of the compound, substantially as herein set forth.

In testimony whereof I have hereunto set my hand in presence of two subscribing witnesses.

JACOB J. E. McLELLAND.

Witnesses:
J. R. HILL,
N. LEVINGSTON.